United States Patent
Huang et al.

(10) Patent No.: US 12,340,626 B2
(45) Date of Patent: Jun. 24, 2025

(54) THREE-DIMENSIONAL GESTURE DETECTION DEVICE AND THREE-DIMENSIONAL GESTURE DETECTION METHOD

(71) Applicant: Acer Incorporated, New Taipei (TW)

(72) Inventors: Shih-Ting Huang, New Taipei (TW); Chao-Shih Huang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 382 days.

(21) Appl. No.: 17/820,985

(22) Filed: Aug. 19, 2022

(65) Prior Publication Data

US 2023/0097355 A1 Mar. 30, 2023

(51) Int. Cl.
*G06V 40/20* (2022.01)
*G06F 3/01* (2006.01)
*G06T 7/246* (2017.01)

(52) U.S. Cl.
CPC ............. *G06V 40/28* (2022.01); *G06F 3/017* (2013.01); *G06T 7/251* (2017.01)

(58) Field of Classification Search
CPC ...... G06V 40/28; G06V 10/426; G06V 10/82; G06V 40/113; G06F 3/017; G06F 3/011; G06F 3/0304; G06T 7/251
See application file for complete search history.

(56) References Cited

U.S. PATENT DOCUMENTS

| 8,830,312 B2 | 9/2014 | Hummel et al. |
| 9,864,433 B2 | 1/2018 | Pinault et al. |
| 9,916,012 B2 | 3/2018 | Kimura et al. |

(Continued)

FOREIGN PATENT DOCUMENTS

| CN | 105528061 A | * | 4/2016 |
| CN | 105849673 A | | 8/2016 |

(Continued)

OTHER PUBLICATIONS

Taiwanese Office Action issued in TW Application No. 110136554 dated Jun. 28, 2022.

*Primary Examiner* — Oneal R Mistry
*Assistant Examiner* — Jongbong Nah
(74) *Attorney, Agent, or Firm* — Birch, Stewart, Kolasch & Birch, LLP

(57) ABSTRACT

A three-dimensional gesture detection device and a three-dimensional gesture detection method are provided. The three-dimensional gesture detection device includes a node detection unit, a gesture recognition model and a gesture trajectory detection unit. The node detection unit obtains several nodes according to each of the hand frames of a continuous hand image. The gesture recognition model obtains confidence levels of several gesture categories. The gesture trajectory detection unit includes a weight analyzer, a gesture analyzer, a key point classifier and a trajectory analyzer. The weight analyzer obtains weights of the gesture categories through a user interface. The gesture analyzer performs a weighting calculation on the confidence levels of the gesture categories to analyze a gesture on each of the hand frames. The key point classifier classifies several key points from the nodes. The trajectory analyzer obtains an inertial trajectory of the gesture according to the key points.

20 Claims, 11 Drawing Sheets

(56) References Cited

U.S. PATENT DOCUMENTS

| | | | |
|---|---|---|---|
| 2008/0129694 A1 | 6/2008 | Haven | |
| 2014/0306875 A1 | 10/2014 | He et al. | |
| 2015/0153833 A1* | 6/2015 | Pinault | G06F 3/011 |
| | | | 345/156 |
| 2016/0124513 A1* | 5/2016 | Dal Zot | G06F 3/017 |
| | | | 715/863 |
| 2017/0097687 A1* | 4/2017 | Pinault | G06F 3/017 |
| 2017/0123487 A1* | 5/2017 | Hazra | G06F 3/0482 |
| 2017/0285759 A1 | 10/2017 | Ahn et al. | |
| 2018/0024641 A1* | 1/2018 | Mao | A63F 13/428 |
| | | | 382/103 |
| 2019/0362557 A1* | 11/2019 | Lacey | G06T 5/20 |

FOREIGN PATENT DOCUMENTS

| | | |
|---|---|---|
| CN | 111475024 A | 7/2020 |
| KR | 10-1761050 B1 | 7/2017 |
| TW | 201908919 A | 3/2019 |

* cited by examiner

THREE-DIMENSIONAL GESTURE DETECTION DEVICE AND THREE-DIMENSIONAL GESTURE DETECTION METHOD

This application claims the benefit of Taiwan application Serial No. 110136554, filed Sep. 30, 2021, the disclosure of which is incorporated by reference herein in its entirety.

TECHNICAL FIELD

The invention relates in general to a detection device and a detection method, and more particularly to a three-dimensional gesture detection device and a three-dimensional gesture detection method.

BACKGROUND

Along with the advance in image recognition technology, a gesture detection technology has been provided. The gesture detection technology enables a user to perform intuitive gesture control on an electronic device.

However, gestures detected using currently available technologies are not stable. Sometimes, gestures may not be detected, or may be detected with errors or intermittence. The technology of gesture control still has bottlenecks to break through. Researchers are now engaged in resolving the problem of unstable detection.

SUMMARY

The invention is directed to a three-dimensional gesture detection device and a three-dimensional gesture detection method. The inertial trajectory is not only determined according to the gesture GT but also the analysis is performed with reference to the nodes ND, so that the inertial trajectory TR can be continuous and smooth for better gesture detection.

According to one embodiment, a three-dimensional gesture detection device is provided. The three-dimensional gesture detection device includes a node detection unit, a gesture recognition model and a gesture trajectory detection unit. The node detection unit is used to receive a continuous hand image. The continuous hand image contains several hand frames. The node detection unit obtains several nodes according to each of the hand frames. The gesture recognition model is used to obtain confidence levels of several gesture categories according to the nodes. The gesture trajectory detection unit includes a weight analyzer, a gesture analyzer, a key point classifier and a trajectory analyzer. The weight analyzer is used to obtain weights of several gesture categories through a user interface. The gesture analyzer is used to perform a weighting calculation on the confidence levels of the gesture categories according to the weights to analyze a gesture on each of the hand frames. The key point classifier is used to classify several key points from the nodes according to the gesture. The trajectory analyzer is used to obtain an inertial trajectory of the gesture according to changes in the key points on the hand frames.

According to another embodiment, a three-dimensional gesture detection method is provided. The three-dimensional gesture detection method includes the following steps. A continuous hand image is obtained, wherein the continuous hand image contains several hand frames. Several nodes are obtained according to each of the hand frames. Confidence levels of several gesture categories are obtained according to the nodes. Weights of several gesture categories are obtained through a user interface. A weighting calculation is performed on the confidence levels of the gesture categories according to the weights to analyze a gesture on each of the hand frames. Several key points are classified from the nodes according to the gesture. An inertial trajectory of the gesture is obtained according to changes in the key points on the hand frames.

The above and other aspects of the invention will become better understood with regard to the following detailed description of the preferred but non-limiting embodiment(s). The following description is made with reference to the accompanying drawings.

DETAILED DESCRIPTION

Figure 1:
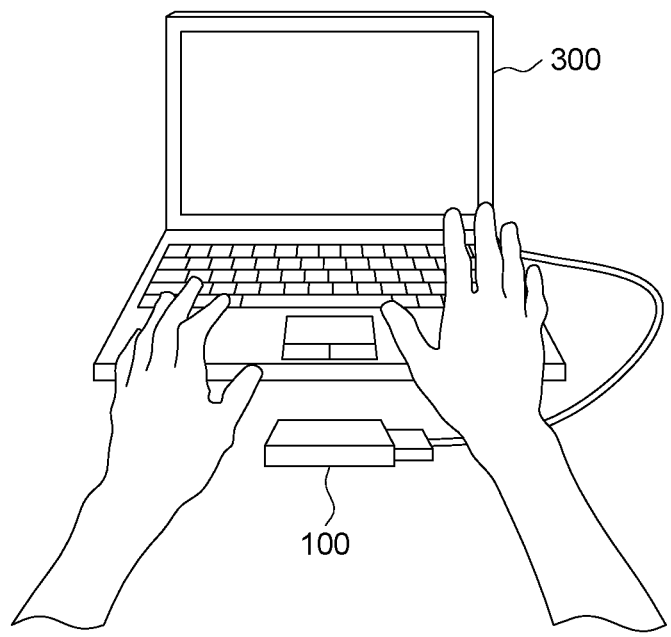
FIG. 1 is a schematic diagram of a three-dimensional gesture detection device according to an embodiment.

Referring to FIG. 1, a schematic diagram of a three-dimensional gesture detection device 100 according to an embodiment is shown. The three-dimensional gesture detection device 100 can be realized by an external electronic device, and can be connected to a notebook 300 through an USB port. Or, the three-dimensional gesture detection device can be built in the notebook 300. As indicated in FIG. 1, the user can make gesture above the three-dimensional gesture detection device 100, so that the three-dimensional gesture detection device 100 can be used as an intuitive input device of the notebook 300.

Figure 2:
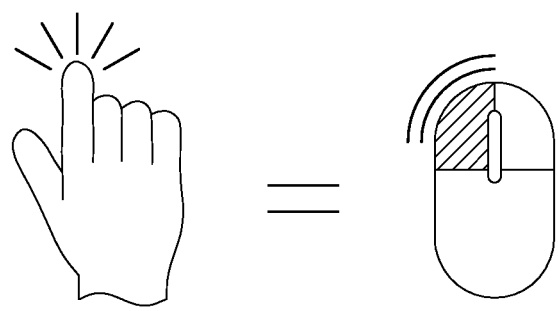
FIG. 2 is an illustrative diagram of an action corresponding to a "tap" gesture.

Take FIG. 2 for example. FIG. 2 is an illustrative diagram of an action corresponding to a "tap" gesture. The notebook 300 can define that when the "tap" gesture is detected, the action of clicking the left key of the mouse is activated. The notebook 300 can further define that when the "tap" gesture moves in the air, a drag movement is activated.

Figure 3:
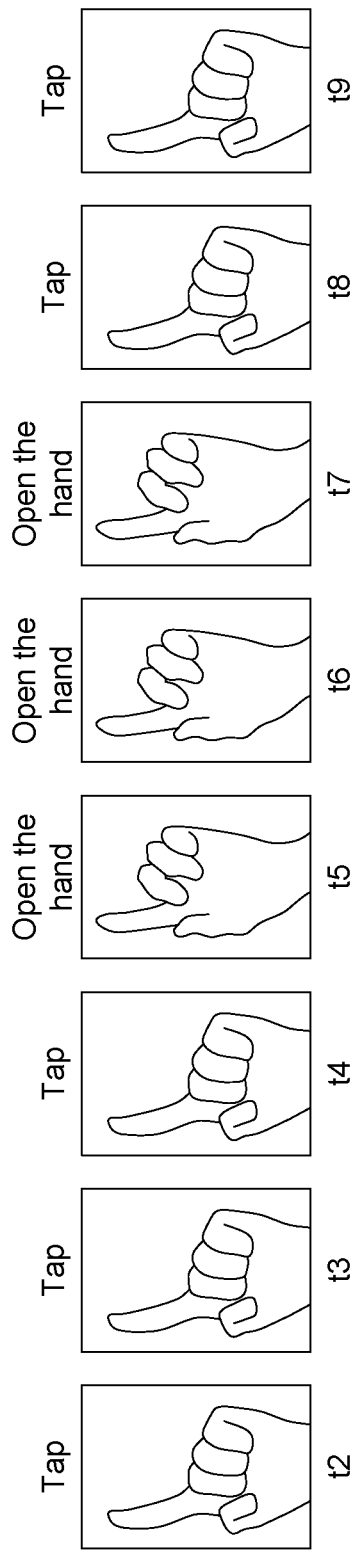
FIG. 3 is a schematic diagram of several hand frames obtained at different time points.

However, to make the drag movement smooth, the "tap" gesture must be detected on each of the hand frames. Referring to FIG. 3, a schematic diagram of several hand frames obtained at time points t2 to t9 is shown. During gesture detection, if the user's hand is opened or the ambient brightness changes, it may result in a case that the "tap"

gesture is detected only at time points t2 to t4, t8, and t9, but the hand frames at time points t5 to t7 are detected as an "open the hand" gesture.

Figure 4:
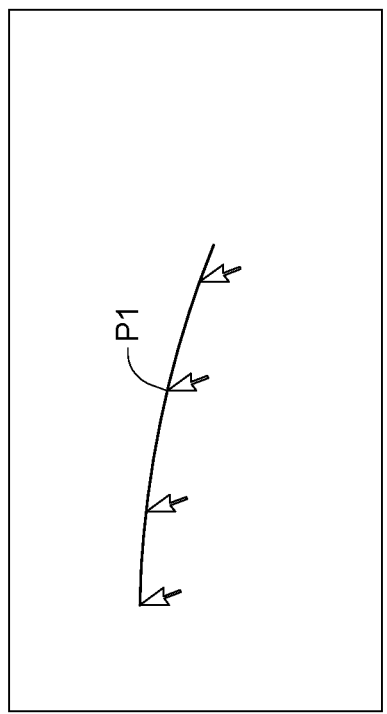
FIG. 4 is a schematic diagram of detecting corresponding operations of the gestures of FIG. 3.

Referring to FIG. 4, a schematic diagram of detecting corresponding operations of the gestures of FIG. 3 is shown. Since the "tap" gesture is detected only on the hand frames obtained at time points t2 to t4, t8, and t9, the cursor trajectory of the notebook 300 will stay at point P1 for a period of time (that is, time points t5 to t7), making the drag movement non-smooth.

Figure 5:
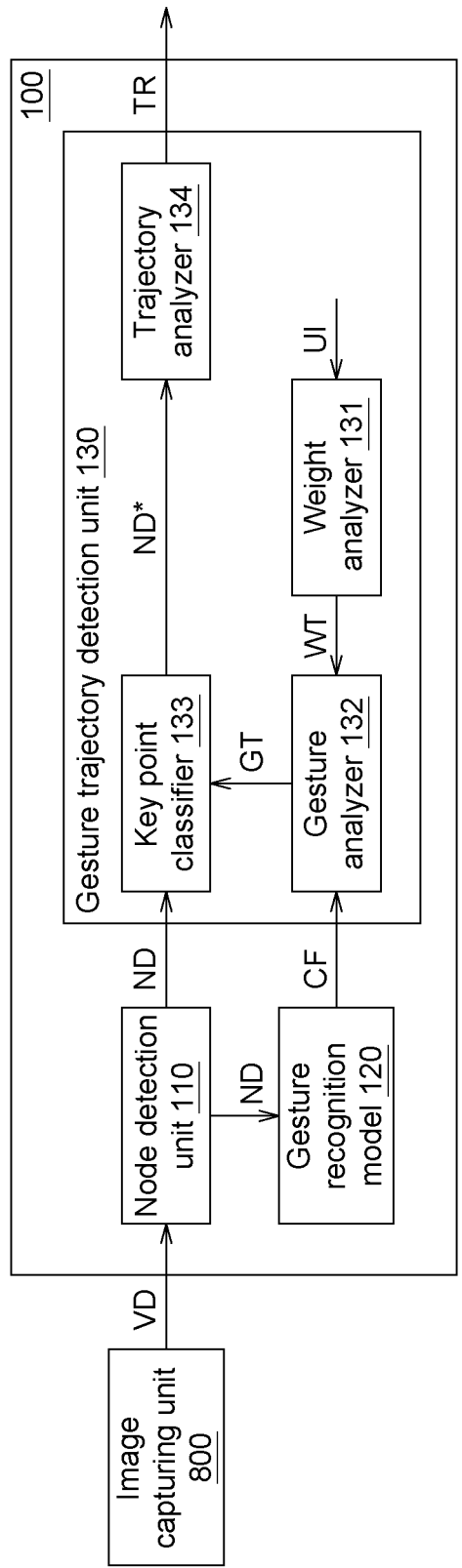
FIG. 5 is a block diagram of a three-dimensional gesture detection device according to an embodiment.

Referring to FIG. 5, a block diagram of a three-dimensional gesture detection device 100 according to an embodiment is shown. The three-dimensional gesture detection device 100 includes a node detection unit 110, a gesture recognition model 120 and a gesture trajectory detection unit 130. The gesture trajectory detection unit 130 includes a weight analyzer 131, a gesture analyzer 132, a key point classifier 133 and a trajectory analyzer 134.

The node detection unit 110 is used to detect nodes ND. The gesture recognition model 120 is used to analyze confidence levels CF of the gesture categories. Both the nodes ND and the confidence levels CF of the gesture categories are inputted to the gesture trajectory detection unit 130 to perform an analysis of inertial trajectory TR. The node detection unit 110, the gesture recognition model 120 and the gesture trajectory detection unit 130 can be realized by such as a circuit, a chip, a circuit board, a code, or a storage device that stores code. In the present embodiment, the analysis of gesture GT has been adaptively adjusted according to the user interface UI, therefore becomes more stable. Besides, the gesture trajectory detection unit 130 does not only determine the inertial trajectory TR according to the gesture GT but the gesture trajectory detection unit also analyzes the nodes ND to make the inertial trajectory TR continuous and smooth. Detailed operations of each of the abovementioned elements are disclosed below with an accompanying flowchart.

Figure 6:
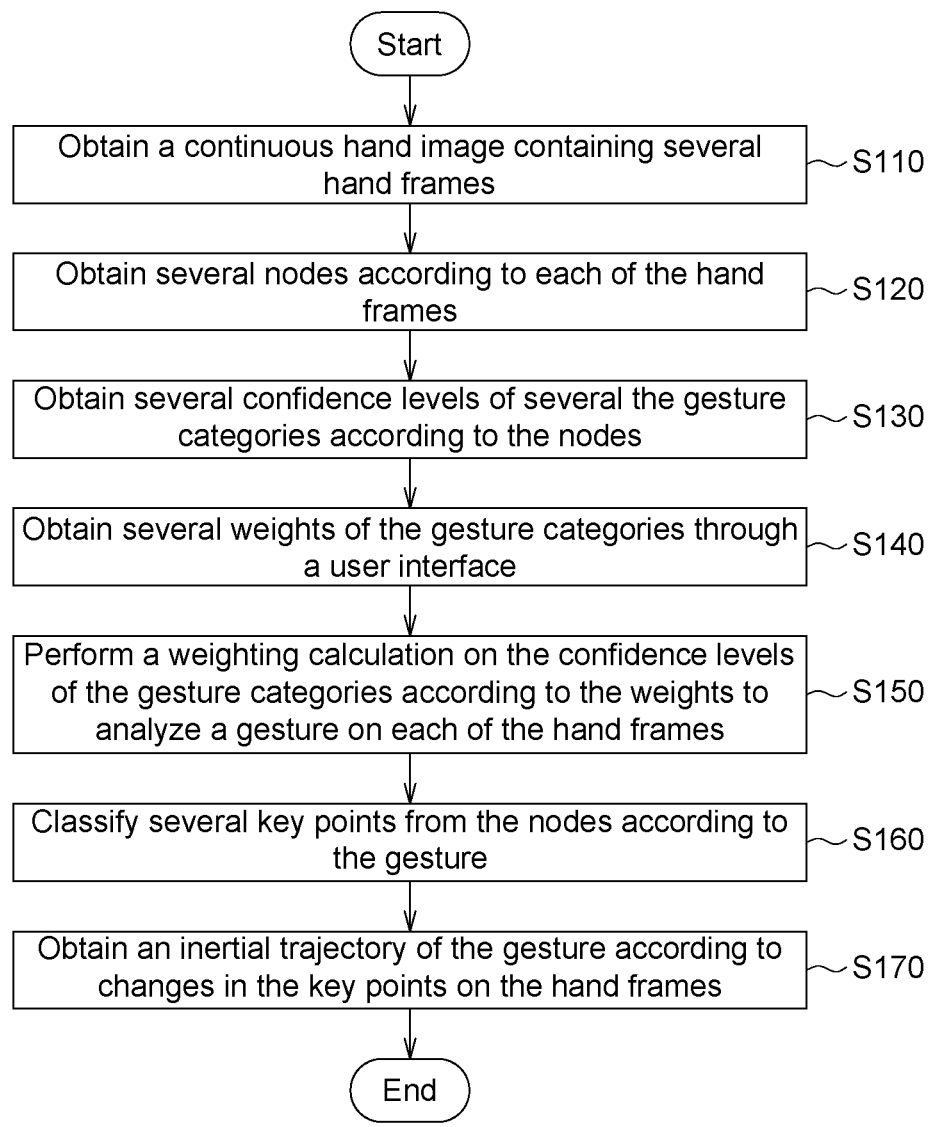
FIG. 6 is a flowchart of a three-dimensional gesture detection method according to an embodiment.
Figure 7:
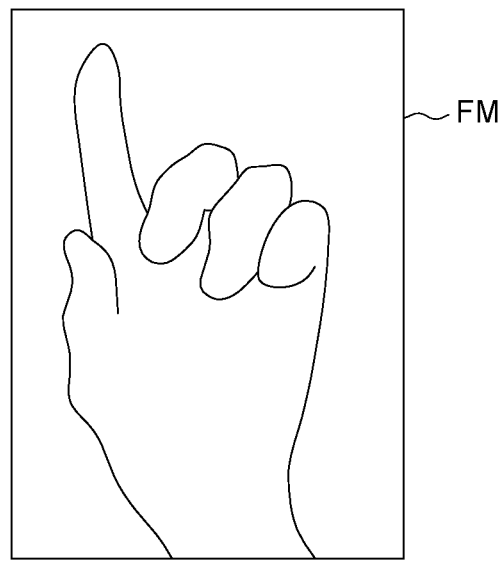
FIG. 7 is an illustrative diagram of step S110.

Referring to FIGS. 5 and 6, FIG. 6 is a flowchart of a three-dimensional gesture detection method according to an embodiment. The three-dimensional gesture detection method includes steps S110 to S170. Referring to FIG. 7, an illustrative diagram of step S110 is shown. In step S110, a continuous hand image VD is obtained by an image capturing unit 800. The continuous hand image VD contains several hand frames FM (illustrated in FIG. 7). In an embodiment, the image capturing unit 800 can be built in the three-dimensional gesture detection device 100. The image capturing unit 800 can be realized by a color camera or an infrared camera.

Figure 8:
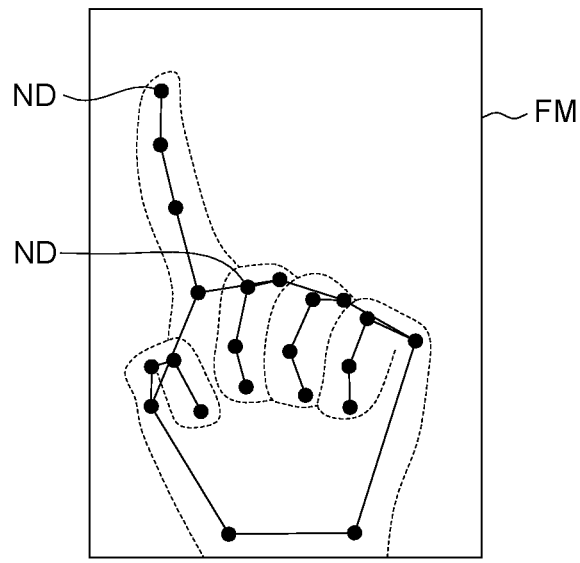
FIG. 8 is an illustrative diagram of step S120.

Referring to FIG. 8, an illustrative diagram of step S120 is shown. In step S120, the continuous hand image VD is received and several nodes ND are obtained by the node detection unit 110 according to each of the hand frames FM. In the present embodiment, the nodes ND are inputted to the gesture recognition model 120 and the gesture trajectory detection unit 130.

Figure 9:
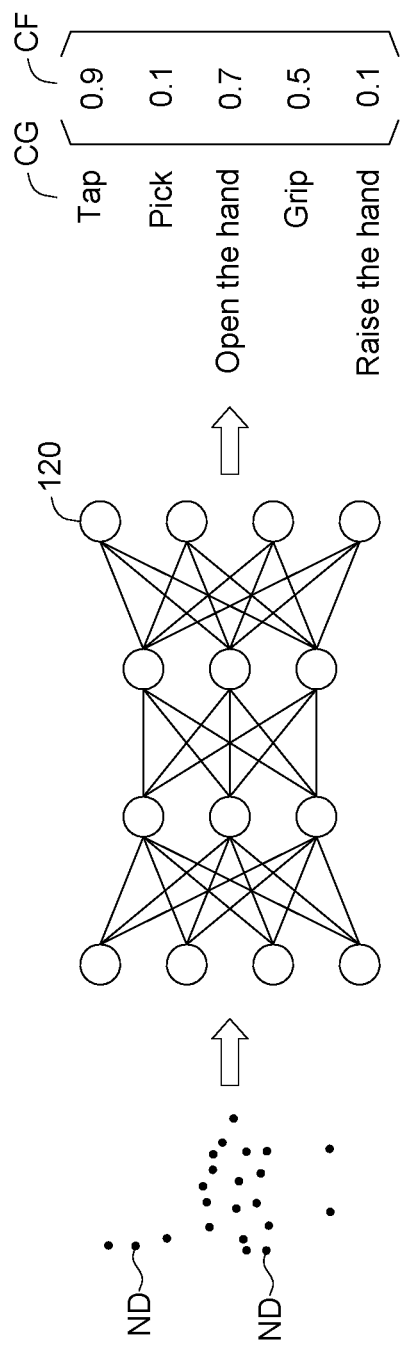
FIG. 9 is an illustrative diagram of step S130.

Referring to FIG. 9, an illustrative diagram of step S130 is shown. In step S130, several confidence levels CF of the gesture categories CG are obtained by the gesture recognition model 120 according to the nodes ND. After the nodes ND on each of the hand frames FM are inputted to the gesture recognition model 120, the confidence levels CF corresponding to various predetermined gesture categories can be outputted. For example, the confidence levels CF corresponding to the gesture categories CG including "tap", "pick", "open the hand", "grip", and "raise the hand" are 0.9, 0.1, 0.7, 0.5, and 0.1, respectively. The "tap" gesture is the gesture category CG with the highest confidence level CF.

In the present embodiment, after obtaining the confidence levels CF of the gesture categories, the gesture recognition model 120 does not directly use the gesture category with the highest confidence level CF as the analysis result of the gesture GT but inputs the confidence levels CF of the gesture categories to the gesture trajectory detection unit 130 instead.

Figure 10:
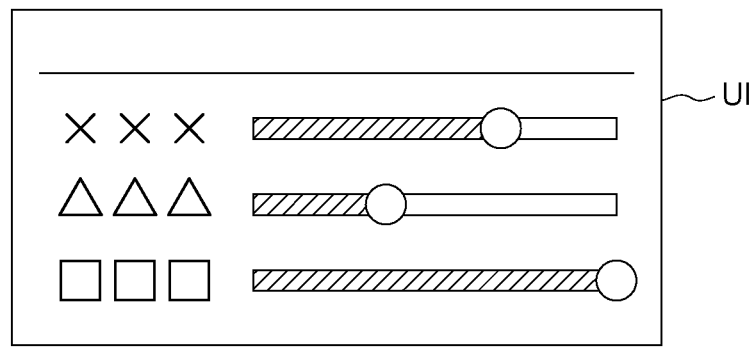
FIG. 10 is an illustrative diagram of step S140.

Referring to FIG. 10, an illustrative diagram of step S140 is shown. In step S140, several weights WT of the gesture categories CG are obtained by the weight analyzer 131 through a user interface UI. For example, the gesture category most likely used by the user interface UI of FIG. 10 is the "tap" gesture category CG. Since other gesture categories CG such as "pick", "open the hand", "grip", and "raise the hand" are barely used, the weights WT corresponding to "tap", "pick", "open the hand", "grip", "raise the hand" can be set as: {0.9, 0.1, 0.1, 0.1, 0.1} or {0.9, 0.0, 0.0, 0.0, 0.0}.

Figure 11:
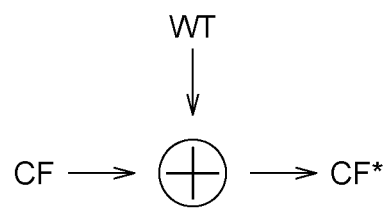
FIG. 11 is an illustrative diagram of step S150.

Referring to FIG. 11, an illustrative diagram of step S150 is shown. In step S150, a weighting calculation is performed on the confidence levels CF of the gesture categories by the gesture analyzer 132 according to the weights WT to obtain the confidence levels CF* of the gesture categories * to analyze each gesture GT of the hand frames FM. After the weighting calculation is performed, the "tap" gesture of the user interface UI of FIG. 10 will not be erroneously determined as the "open the hand" gesture.

Figure 12:
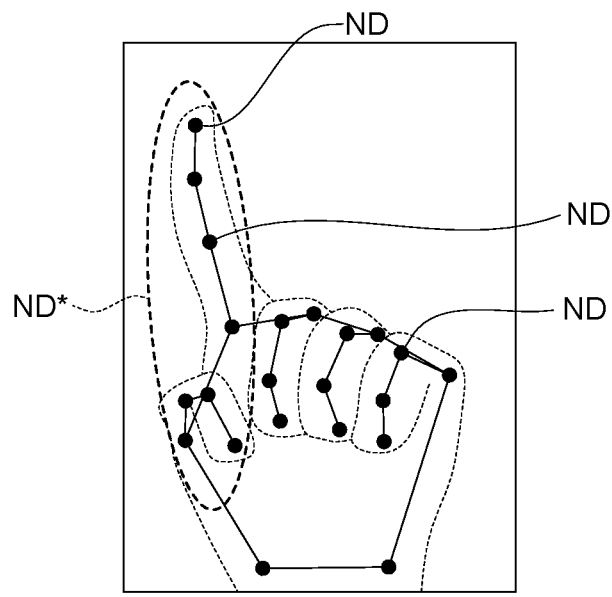
FIG. 12 is an illustrative diagram of step S160.

Referring to FIG. 12, an illustrative diagram of step S160 is shown. In step S160, several key points ND* are classified from the nodes ND by the key point classifier 133 according to the gesture GT. Take the "tap" gesture GT for example. The user may release the middle finger, the ring finger and the little finger, but normally would not release the index finger and the thumb. Hence, the key points ND* can be set as the nodes ND of the index finger and the thumb. Through the setting of the key points ND*, the continuity of the inertial trajectory can be improved.

Figure 13:
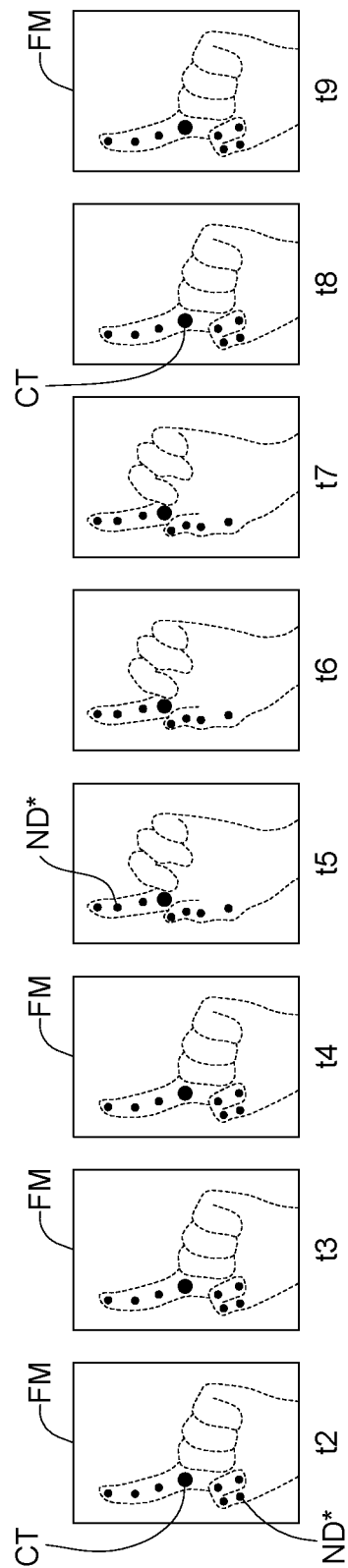
FIG. 13 is an illustrative diagram of step S170.

Referring to FIG. 13, an illustrative diagram of step S170 is shown. In step S170, an inertial trajectory TR of the gesture GT is obtained by the trajectory analyzer 134 according to changes in the key points ND* on the hand frames FM.

In an embodiment, the key points ND* on the hand frames FM include changes in a center of gravity CT. In the present embodiment, as long as the key points ND* are obtained on a hand frame FM, the said hand frame FM is added to the analysis of the inertial trajectory TR. Thus, the inertial trajectory TR can be smoothly detected.

In an embodiment, the trajectory analyzer 134 can perform analysis according to an average mean algorithm, a single-exponential algorithm, a double-exponential algorithm, or a Kalman filter algorithm.

Figure 14A:
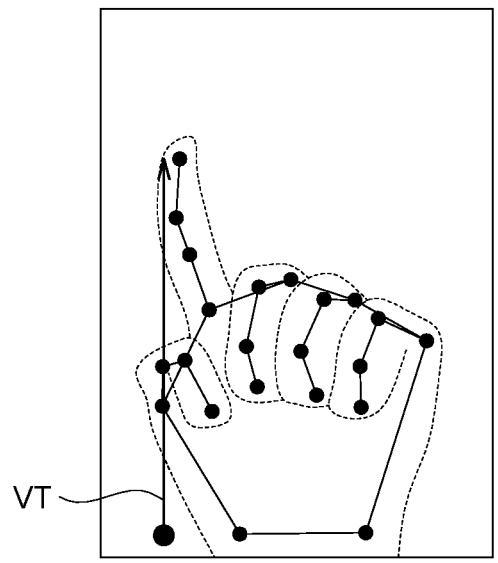
FIGS. 14A and 14B are illustrative diagrams of other changes in key points.
Figure 14B:
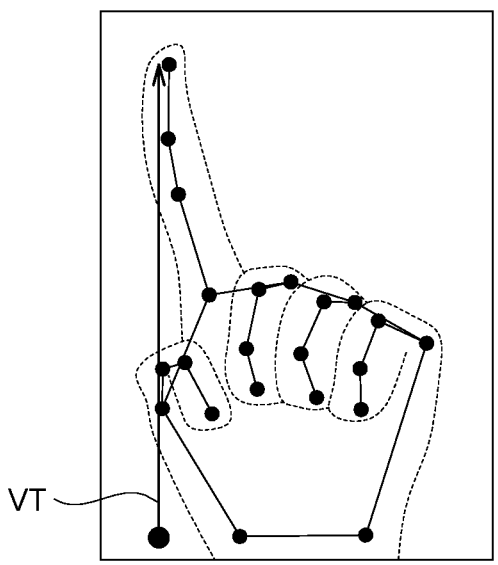

Referring to FIGS. 14A and 14B, illustrative diagrams of other changes in key points ND* are shown. In another embodiment, changes in the key points ND* on the hand frames FM include changes in a vector length. As indicated in FIGS. 14A and 14B, the vector length can be analyzed according to a longest radial VT of the key points ND*. The trajectory analyzer 134 can analyze the inertial trajectory TR according to changes in the vector length. For example, when the vector length increases, this indicates that the user upwardly slides the index finger.

Figure 15A:
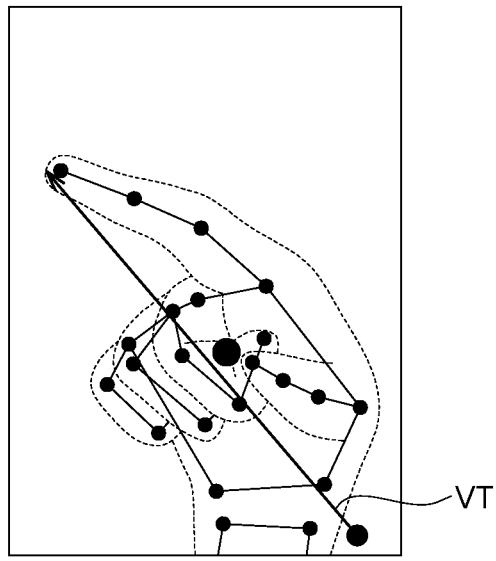
FIGS. 15A and 15B are illustrative diagrams of other changes in key points.
Figure 15B:
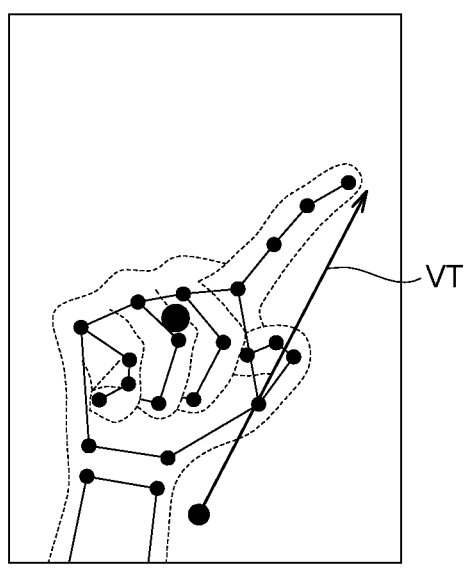

Referring to FIGS. 15A and 15B, are illustrative diagrams of other changes in key points ND* are shown. In another embodiment, changes in the key points ND* on the hand frames FM include changes in a vector angle. As indicated in FIGS. 15A and 15B, the vector angle can be analyzed according to the longest radial VT of the key points ND*. The trajectory analyzer 134 can analyze the inertial trajectory TR according to the changes in the vector angle. For example, when the vector angle changes from a negative value to a positive one, this indicates that the user slides the index finger to the right direction.

According to the above embodiments, the user interface UI is adaptively adjusted according to an analysis of the gesture GT, so that the analysis of the gesture GT becomes more stable. Moreover, the gesture trajectory detection unit 130 does not only determine the inertial trajectory according to the gesture GT but the gesture trajectory detection unit also performs analysis with reference to the nodes ND, so that the inertial trajectory TR becomes continuous and smooth.

Figure 16:
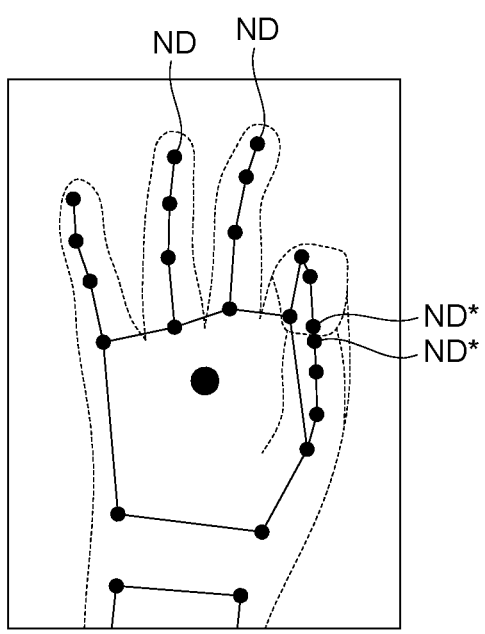
FIG. 16 is another illustrative diagram of step S160.

Referring to FIG. 16, another illustrative diagram of step S160 is shown. In step S160, several key points ND* are classified from the nodes ND by the key point classifier 133 according to the gesture GT. Take the "pick" gesture GT for example. Although the user may release the middle finger, the ring finger and the little finger, the user normally would not release the index finger and the thumb. Hence, the key points ND* can be set as the nodes ND of the index finger and the thumb. Through the setting of the key points ND*, the continuity of the inertial trajectory can be improved.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A three-dimensional gesture detection device, comprising:
   a node detection unit, used to receive a continuous hand image containing a plurality of hand frames, wherein the node detection unit obtains a plurality of nodes according to each of the hand frames;
   a gesture recognition model, used to obtain a plurality of confidence levels of a plurality of the gesture categories each of which is tap, pick, open the hand, grip, or raise the hand according to the nodes; and
   a gesture trajectory detection unit, comprising:
      a weight analyzer, used to obtain a plurality of weights of the gesture categories each of which is tap, pick, open the hand, grip, or raise the hand through a user interface;
      a gesture analyzer, used to performs a weighting calculation on the confidence levels of the gesture categories according to the weights to analyze a gesture on each of the hand frames;
      a key point classifier, used to classify a plurality of key points from part of the nodes according to the gesture; and
      a trajectory analyzer, used to obtain an inertial trajectory of the gesture according to changes in the key points on the hand frames.

2. The three-dimensional gesture detection device according to claim 1, wherein if the gesture is tap, then the key points are nodes of an index finger and a thumb.

3. The three-dimensional gesture detection device according to claim 1, wherein if the gesture is pick, then the key points are nodes of tips of both an index finger and a thumb.

4. The three-dimensional gesture detection device according to claim 1, wherein changes in the key points on the hand frames comprise changes in a center of gravity.

5. The three-dimensional gesture detection device according to claim 1, wherein changes in the key points on the hand frames comprise changes in a vector angle.

6. The three-dimensional gesture detection device according to claim 5, wherein changes in the key points on the hand frames comprise changes in a vector length.

7. The three-dimensional gesture detection device according to claim 1, wherein the trajectory analyzer analyzes the inertial trajectory according to an average mean algorithm.

8. The three-dimensional gesture detection device according to claim 1, wherein the trajectory analyzer analyzes the inertial trajectory according to a single-exponential algorithm.

9. The three-dimensional gesture detection device according to claim 1, wherein the trajectory analyzer analyzes the inertial trajectory according to a double-exponential algorithm.

10. The three-dimensional gesture detection device according to claim 1, wherein the trajectory analyzer analyzes the inertial trajectory according to a Kalman filter algorithm.

11. A three-dimensional gesture detection method, comprising:
   obtaining a continuous hand image containing a plurality of hand frames;
   obtaining a plurality of nodes according to each of the hand frames;
   obtaining a plurality of confidence levels of a plurality of the gesture categories each of which is tap, pick, open the hand, grip, or raise the hand according to the nodes;
   obtaining a plurality of weights of the gesture categories each of which is tap, pick, open the hand, grip, or raise the hand through a user interface;
   performing a weighting calculation on the confidence levels of the gesture categories according to the weights to analyze a gesture on each of the hand frames;
   classifying a plurality of key points from part of the nodes according to the gesture; and
   obtaining an inertial trajectory of the gesture according to changes in the key points on the hand frames.

12. The three-dimensional gesture detection method according to claim 11, wherein if the gesture is tap, then the key points are nodes of an index finger and a thumb.

13. The three-dimensional gesture detection method according to claim 11, wherein if the gesture is pick, then the key points are nodes of tips of both an index finger and a thumb.

14. The three-dimensional gesture detection method according to claim 11, wherein changes in the key points on the hand frames comprise changes in a center of gravity.

15. The three-dimensional gesture detection method according to claim 11, wherein changes in the key points on the hand frames comprise changes in a vector angle.

16. The three-dimensional gesture detection method according to claim 15, wherein changes in the key points on the hand frames comprise changes in a vector length.

17. The three-dimensional gesture detection method according to claim 11, wherein the trajectory analyzer analyzes the inertial trajectory according to an average mean algorithm.

18. The three-dimensional gesture detection method according to claim 11, wherein the trajectory analyzer analyzes the inertial trajectory according to a single-exponential algorithm.

19. The three-dimensional gesture detection method according to claim 11, wherein the trajectory analyzer analyzes the inertial trajectory according to a double-exponential algorithm.

20. The three-dimensional gesture detection method according to claim 11, wherein the trajectory analyzer analyzes the inertial trajectory according to a Kalman filter algorithm.

\* \* \* \* \*